US006818303B2

(12) United States Patent
Lassmann et al.

(10) Patent No.: US 6,818,303 B2
(45) Date of Patent: Nov. 16, 2004

(54) POWDER CLEARCOAT DISPERSIONS (POWDER SLURRY CLEARCOATS), METHOD FOR PRODUCING THEM AND THE USE THEREOF

(75) Inventors: Walter Lassmann, Münster (DE); Horst Hintze-Brüning, Münster (DE); Wolfgang Bremser, Münster (DE); Ulrike Röckrath, Senden (DE)

(73) Assignee: BASF Coatings AG, Munster (DE)

( * ) Notice: Subject to any disclaimer, the term of this patent is extended or adjusted under 35 U.S.C. 154(b) by 66 days.

(21) Appl. No.: 10/296,029

(22) PCT Filed: Jun. 1, 2001

(86) PCT No.: PCT/EP01/06222
§ 371 (c)(1),
(2), (4) Date: Nov. 19, 2002

(87) PCT Pub. No.: WO01/92426
PCT Pub. Date: Dec. 6, 2001

(65) Prior Publication Data
US 2003/0153662 A1 Aug. 14, 2003

(30) Foreign Application Priority Data
Jun. 2, 2000 (DE) ......................... 100 27 290

(51) Int. Cl.$^7$ ................ B32B 27/18; B32B 31/00; C08J 3/05; C08J 3/215
(52) U.S. Cl. ................ 428/411.1; 427/385.5; 524/377; 524/800; 524/804; 524/832; 524/904
(58) Field of Search .............. 428/411.1; 427/385.5; 524/377, 800, 804, 832, 904

(56) References Cited
U.S. PATENT DOCUMENTS

| 4,268,542 A | | 5/1981 | Sakakibara et al. ......... 427/195 |
| 4,385,138 A | * | 5/1983 | Sagane et al. .............. 523/402 |
| 4,476,271 A | | 10/1984 | Kano et al. .................. 524/377 |
| 4,954,559 A | * | 9/1990 | Den Hartog et al. ....... 524/507 |
| 5,502,101 A | * | 3/1996 | Schwarte et al. ........... 524/460 |
| 5,922,796 A | | 7/1999 | Colombet et al. .......... 524/300 |
| 5,965,213 A | | 10/1999 | Sacharski et al. ........... 427/475 |
| 5,981,653 A | | 11/1999 | Wilmes et al. .............. 524/839 |
| 6,159,556 A | | 12/2000 | Möller et al. ................ 427/475 |
| 6,177,487 B1 | | 1/2001 | Sapper et al. ................ 523/333 |
| 6,258,875 B1 | * | 7/2001 | Vogt-Birnbrich et al. ... 523/417 |
| 6,291,579 B1 | | 9/2001 | Kalck et al. ................. 524/832 |
| 6,344,501 B1 | | 2/2002 | Sierakowski et al. ....... 523/410 |

FOREIGN PATENT DOCUMENTS

| DE | 196 18 657 | 1/1997 |
| DE | 198 41 408 | 3/2000 |
| EP | 654 264 | 5/1995 |
| EP | 714 958 | 11/1995 |
| WO | WO 97/15616 | 5/1997 |

OTHER PUBLICATIONS

BASF Coatings AG, et al., USSN 09/762,119, filed Jan. 2, 2001, Issued Nov. 26, 2002 as Patent No. 6,485,793, pp. 1–32 and Abstract.
BASF Coatings AG, et al., USSN 09/786,593, filed Feb. 4, 2001, pp. 1–41, and Abstract.
BASF Coatings AG, et al., USSN 09/786,956, filed Dec. 3, 2001, pp. 1–33 and Abstract.
BASF Coatings AG, et al., USSN 09/889,647, filed Jul. 11, 2001, pp. 1–75 and Abstract.

* cited by examiner

*Primary Examiner*—Ramsey Zacharia

(57) ABSTRACT

Powder clearcoat dispersions (powder slurry clearcoats) preparable by dispersing a powder clearcoat in an aqueous medium and wet milling the resulting powder slurry, at least one adduct of ethylene oxide and/or propylene oxide with at least one glycol being added to the powder slurry prior to wet milling; and the use of the powder slurry clearcoats for producing clearcoat finishes, especially as part of multicoat color and/or effect finishes.

11 Claims, No Drawings

POWDER CLEARCOAT DISPERSIONS (POWDER SLURRY CLEARCOATS), METHOD FOR PRODUCING THEM AND THE USE THEREOF

This application is a National Phase Application of Patent Application PCT/EP01/06222 filed on 01 Jun 2001.

The present invention relates to powder clearcoat dispersions (powder slurry clearcoats). The present invention further relates to a novel process for preventing surface defects in clearcoat finishes. The present invention relates, moreover, to the use of the novel powder slurry clearcoats in automotive finishing, in the interior and exterior coating of constructions, in furniture, door and window coating and in industrial coating, including coil coating and container coating.

Color and/or effect finishes on motor vehicle bodies, especially automobile bodies, nowadays consist preferably of two or more coats which are applied on top of one another and have different properties.

For example, a substrate has applied to it, in succession, an electrodeposition coating (EDC) as primer, a surfacer coat or antistonechip primer, a basecoat, and a clearcoat. The particular purpose of the EDC is to protect the metal panel against corrosion. In the art it is also commonly referred to as the primer. The surfacer coat serves to cover over unevennesses in the substrate and, by its elasticity, to ensure stone-chip resistance. If desired, the surfacer coat may also act to reinforce the hiding power and to deepen the color of the coating system.

The base coat contributes the colors and/or optical effects. The clearcoat is used to intensify the optical effects and to protect the coating system against mechanical and chemical damage. Basecoat and clearcoat are often also referred to collectively as the topcoat. For further details, reference is made to Römpp Lexikon Lacke und Druckfarben, George Thieme Verlag, Stuttgart, New York, 1998, pages 49 and 51, "Automotive finishes".

An important objective in modern automotive finishing is significantly to reduce, or do away altogether with, the amount of organic solvents released in the course of the coating operation. Appropriate coating materials, such as EDCs, aqueous surfacers or aqueous clearcoats, powder coating materials or powder slurry clearcoats, are available.

Of these, the powder slurry clearcoats, which are known, for example, from U.S. Pat. Nos. 4,268,542 A1 and 5,379,947 A1 and from the Patent Applications EP 0 714 958 A2, DE 195 40 977 A1, DE 195 18 392 A1, DE 196 17 086 A1, DE-A-196 13 547, EP 0 652 264 A1, DE 196 18 657 A1, DE 196 52 813 A1, DE 196 17 086 A1, DE 198 14 471 A1 and DE 198 35 206 A1, offer particular advantages: firstly, they can be prepared and applied without solvent, like the powder coating materials; secondly, the customary and known spraying techniques for liquid coating materials may be employed for their application.

A disadvantage of the powder slurry clearcoats known to date is that the clearcoat finishes produced therefrom in some cases have surface defects such as depressions, craters and agglomerates, which detract from the otherwise excellent overall visual impression. Nor has it been possible to date entirely to eliminate this problem by adding additives such as wetting agents, emulsifiers, dispersing auxiliaries or defoamers during the preparation of the powder slurry clearcoats.

It is an object of the present invention to find new powder clearcoat dispersions (powder slurry clearcoats) which, like the powder slurry clearcoats known to date, provide clearcoat finishes with an excellent overall visual impression and high scratch, chemical and weathering resistance but without surface defects such as depressions, craters or agglomerates.

Accordingly, the novel powder clearcoat dispersions (powder slurry clearcoats) have been found, which may be prepared by dispersing a powder clearcoat in an aqueous medium and wet milling the resulting powder slurry, at least one adduct of ethylene oxide and/or propylene oxide with at least one glycol being added to the powder slurry prior to wet milling.

In the text below, the novel powder clearcoat dispersions or powder slurry clearcoats are referred to as "powder slurry clearcoats of the invention". Further subject matter of the invention will emerge from the following description.

In the light of the prior art it was surprising and unforeseeable by the skilled worker that the use, in accordance with the invention, of adducts of ethylene oxide and/or propylene oxide with glycols would result in powder slurry clearcoats which provide clearcoat finishes with an excellent overall visual impression and high scratch, chemical and weathering resistance but without surface defects such as depressions, craters or agglomerates.

The powder slurry clearcoats of the invention comprise at least one finely divided dimensionally stable constituent, i.e., a powder coating material, as the disperse phase, and an aqueous medium as the continuous phase.

The finely divided, dimensionally stable constituent or powder coating material may be solid and/or highly viscous. In the context of the present invention, "highly viscous" means that the particles behave essentially as solid particles under the customary and known conditions of the preparation, storage and use of powder slurry clearcoats or powder coatings. The powder coating material is preferably solid.

Furthermore, the individual particles of the finely divided constituent or powder coating material are dimensionally stable. In the context of the present invention, "dimensionally stable" means that under the customary and known conditions of the storage and use of powder slurry clearcoats and powder coatings the particles agglomerate and/or break down into smaller particles only to a small extent, if at all, but essentially retain their original form even under the influence of shear forces.

The solids content of the powder slurry clearcoat of the invention is preferably from 10 to 80, more preferably from 15 to 75, with particular preference from 20 to 70, with very particular preference from 25 to 70, and in particular from 30 to 65% by weight, based in each case on the powder slurry of the invention.

The average particle size of the finely divided dimensionally stable constituents of the powder slurry clearcoat of the invention is preferably from 0.8 to 40 $\mu$m, more preferably from 0.8 to 20 $\mu$m, and with particular preference from 2 to 6 $\mu$m. By average particle size is meant the 50% median value determined by the laser diffraction method, i.e., 50% of the particles have a particle diameter$\leq$the median value and 50% of the particles have a particle diameter$\geq$the median value. In general, the particle size of the finely divided dimensionally stable constituents reaches its upper limit when owing to their size the particles are no longer able to flow out completely on baking, with the consequence of an adverse effect on film leveling. 40 $\mu$m is considered a sensible upper limit, since above this particle size blockage of the rinsing tubes of the highly sensitive application apparatus is to be expected.

Powder slurry clearcoats with average particle sizes of this kind possess better application properties and, at the applied film thicknesses of >30 μm as currently practiced in the automotive industry for the OEM finishing of automobiles, surprisingly exhibit a significantly reduced tendency toward popping and mudcracking than conventional combinations of surfacer, basecoat, and clearcoat.

The powder slurry clearcoat of the invention is essentially free from organic solvents (cosolvents). In the context of the present invention, this means that the clearcoats have a residual volatile solvent content of <5% by weight, preferably <3% by weight and with particular preference <2% by weight, based on the overall weight of the powder slurry clearcoat.

The constituent of the powder slurry clearcoats of the invention that is essential to the invention is at least one adduct of ethylene oxide and/or propylene oxide with at least one glycol, especially ethylene glycol, 1,3- and/or 1,2-propylene glycol or 1,2-1,3- and/or 1,4-butylene glycol.

Examples of highly suitable adducts are polyethylene glycols, polypropylene glycols, block copolymers of ethylene oxide and propylene oxide (Pluronics®) or polytetramethylene glycols (polytetrahydrofurans) (cf. Römpp Lexikon Lacke und Druckfarben, Georg Thieme Verlag, 1998, page 457, "Polyalkylene glycols"), of which the adducts of propylene oxide with 1,3- and/or 1,2-propylene glycol, i.e. the polypropylene glycols are particularly advantageous and are therefore used with particular preference in accordance with the invention.

Particularly suitable polypropylene glycols have a number-average molecular weight of from 350 to 1000, preferably from 400 to 950, with particular preference from 450 to 900, with very particular preference from 500 to 850, and in particular from 550 to 800 daltons.

The polypropylene glycols are commercial products and are marketed, for example, by BASF Aktiengesellschaft under the brand name Pluriol® 400, 600 or 900, the numbers following indicating the molecular weight or its magnitude. Of these, Pluriol® 600 is especially advantageous and is therefore used with particular preference in accordance with the invention.

The amount of the adducts for use in accordance with the invention in the powder slurry clearcoats of the invention is preferably from 0.01 to 2.0, more preferably from 0.1 to 1.5, with particular preference from 0.2 to 1.2, with very particular preference from 0.25 to 1.0, and in particular from 0.3 to 0.8% by weight, based in each case on the solids content of the powder slurry clearcoat of the invention.

Hereinbelow, the solids content is the sum of the constituents of the powder slurry clearcoat of the invention which, after curing, constitute the solids content of the clearcoat finish.

Surprisingly, the effect in accordance with the invention of the adducts described above may be intensified by means of small amounts of solvent having high solvency. By small amounts here are meant amounts of from 0.1 to 1.9, preferably from 0.2 to 1.8, with particular preference from 0.3 to 1.7, with very particular preference from 0.4 to 1.6, and in particular from 0.5 to 1.5 parts by weight per 100 parts by weight of solids of the powder slurry clearcoat of the invention.

Suitable organic solvents are marketed, for example, under the brand name Solvenon® (especially Solvenon® IPP, isopropoxypropanol) by BASF Aktiengesellschaft or under the brand name Solvesso® by Exxon/Esso. Of these, Solvenon® IPP is particularly advantageous and is therefore used with particular preference.

The powder slurry clearcoats of the invention may be curable physically, thermally, with actinic radiation, or thermally and with actinic radiation (dual cure). The thermally curable powder slurry clearcoats of the invention may in turn be self-crosslinking or externally crosslinking.

In the context of the present invention, the term "physical curing" means the curing of a coat of a coating material by film formation as a result of loss of solvent from the coating material, with linking within the coating taking place by looping of the polymer molecules of the binders (regarding the term, cf. Römpp Lexikon Lacke und Druckfarben, Georg Thieme Verlag, Stuttgart, New York, 1998, "Binders", pages 73 and 74). Alternatively, film formation takes place by way of the coalescence of binder particles (cf. Römpp Lexikon Lacke und Druckfarben, Georg Thieme Verlag, Stuttgart, New York, 1998 "Curing", pages 274 and 275). Normally, no crosslinking agents are necessary for this purpose. If desired, physical curing may be assisted by atmospheric oxygen, heat, or exposure to actinic radiation.

In the context of the present invention, the term "self-crosslinking" refers to the property of a binder to undergo crosslinking reactions with itself. The prerequisite for this is that both types of complementary reactive functional groups necessary for crosslinking are already present in the binders. Externally crosslinking coating materials, adhesives and sealing compounds, on the other hand, are those wherein one kind of the complementary reactive functional groups is present in the binder and the other kind is present in a curing or crosslinking agent. For further details, reference is made to Römpp Lexikon Lacke und Druckfarben, Georg Thieme Verlag, Stuttgart, New York, 1998, "Curing", pages 274 to 276, especially 275, bottom.

In the context of the present invention, actinic radiation comprises electromagnetic radiation, such as near infrared (NIR), visible light, UV radiation or x-rays, especially UV radiation, and corpuscular radiation such as electron beams.

If thermal curing and curing with actinic light are employed conjointly, the terms "dual cure" and "dual cure powder slurry clearcoat" are also used.

The powder slurry clearcoats of the invention comprise at least one binder.

The binders are oligomeric and polymeric resins.

In accordance with the invention it is of advantage if the minimum film-forming temperature of the binders is at least 0° C., preferably at least 10, with particular preference at least 15, with very particular preference at least 20, and, in particular, at least 25° C. The minimum film-forming temperature can be determined by drawing down an aqueous dispersion of the binder onto a glass plate using a coating bar or applying a finely divided binder powder to a glass plate and heating it in a gradient oven. The temperature at which the pulverulent layer films is referred to as the minimum film-forming temperature. For further details reference is made to Römpp Lexikon Lacke und Druckfarben, George Thieme Verlag, Stuttgart, New York, 1998, "Minimum film-forming temperature", page 391.

Examples of suitable binders are random, alternating and/or block addition (co)polymers of linear and/or branched and/or comblike construction of ethylenically unsaturated monomers, or polyaddition resins and/or polycondensation resins. For further details of these terms reference is made to Römpp Lexikon Lacke und Druckfarben, George Thieme Verlag, Stuttgart, New York, 1998, page 457, "Polyaddition" and "Polyaddition resins (polyadducts)", and pages 463 and 464, "Polycondensates", "Polycondensation" and "Polycondensation resins", and also pages 73 and 74, "Binders".

Examples of suitable addition (co)polymers are (meth) acrylate (co)polymers or partially hydrolyzed polyvinyl esters, especially (meth)acrylate copolymers.

Examples of suitable polyaddition resins and/or polycondensation resins are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyether-polyurethanes, especially polyester-polyurethanes.

Of these binders, the (meth)acrylate (co)polymers have advantages and are therefore used more frequently.

The self-crosslinking binders of the thermally curable powder coating materials and powder slurry clearcoats and of the dual-cure powder coating materials and powder slurry clearcoats comprise reactive functional groups which are able to enter into crosslinking reactions with groups of their type or with complementary reactive functional groups. The externally crosslinking binders comprise reactive functional groups which are able to enter into crosslinking reactions with complementary reactive functional groups present in crosslinking agents. Examples of suitable complementary reactive functional groups for use in accordance with the invention are summarized in the following overview. In the overview, the variable R is an acyclic or cyclic aliphatic, an aromatic, and/or an aromatic-aliphatic (araliphatic) radical; the variables R' and R" are identical or different aliphatic radicals or are linked to one another to form an aliphatic or heteroaliphatic ring.

unwanted reactions, in particular no premature crosslinking, and/or, if appropriate, should not disrupt or inhibit curing with actinic radiation, and secondly by the temperature range within which crosslinking is to take place.

In the case of the powder slurry clearcoats of the invention, which are curable thermally or thermally and with actinic radiation, it is preferred to employ crosslinking temperatures of from 60 to 180° C. Use is therefore made preferably of thio, hydroxyl, N-methylolamino, N-alkoxymethylamino, imino, carbamate, allophanate and/or carboxyl groups, preferably hydroxyl or carboxyl groups, on the one hand, and preferably crosslinking agents containing anhydride, carboxyl, epoxy, blocked isocyanate, urethane, methylol, methylol ether, siloxane, carbonate, amino, hydroxyl and/or beta-hydroxyalkylamide groups, preferably epoxy, beta-hydroxyalkylamide, blocked isocyanate, urethane or alkoxymethylamino groups, on the other.

In the case of self-crosslinking powder materials and powder slurry clearcoats of the invention, the binders contain in particular methylol, methylol ether, and/or N-alkoxymethylamino groups.

Complementary reactive functional groups especially suitable for use in the powder coating materials and powder slurry clearcoats of the invention are carboxyl groups on the one hand and epoxide groups and/or beta-hydroxyalkylamide groups on the other, and hydroxyl groups on the one hand and blocked isocyanate, urethane or alkoxymethylamino groups on the other.

Overview: Examples of Complementary Functional Groups

| Binder | and | crosslinking agent |
|---|---|---|
| Crosslinking agent | or and | binder |
| —SH | | —C(O)—OH |
| —NH$_2$ | | —C(O)—O—C(O)— |
| —OH | | —NCO |
| —O—(CO)—NH—(CO)—NH$_2$ | | —NH—C(O)—OR |
| —O—(CO)—NH$_2$ | | —CH$_2$—OH |
| >NH | | —CH$_2$—O—R |
| | | —NH—CH$_2$—O—R |
| | | —NH—CH$_2$—OH |
| | | —N(—CH$_2$—O—R)$_2$ |
| | | —NH—C(O)—CH(—C(O)OR)$_2$ |
| | | —NH—C(O)—CH(—C(O)OR)(—C(O)—R) |
| | | —NH—C(O)—NR'R" |
| | | >Si(OR)$_2$ |
| | | ![epoxide] —CH—CH$_2$ with O bridge |
| | | cyclic carbonate —O—C(=O)—O— with —CH—CH$_2$ |
| —C(O)—OH | | ![epoxide] —CH—CH$_2$ with O bridge |
| | | —N=C=N— |
| | | —C(O)—N(CH$_2$—CH$_2$—OH)$_2$ |

The selection of the complementary groups in each case is guided firstly by the fact that during the preparation, storage, application, and melting of the powder slurry clearcoats of the invention they should not enter into any The functionality of the binders in respect of the reactive functional groups described above may vary very widely and depends in particular on the desired crosslinking density and/or on the functionality of the crosslinking agents employed in each case. In the case of carboxyl-containing binders, for example, the acid number is preferably from 10 to 100, more preferably from 15 to 80, with particular preference from 20 to 75, with very particular preference from 25 to 70, and, in particular, from 30 to 65 mg KOH/g. Alternatively, in the case of hydroxyl-containing binders, the OH number is preferably from 15 to 300, more preferably from 20 to 250, with particular preference from 25 to 200, with very particular preference from 30 to 150, and in particular from 35 to 120 mg KOH/g. Alternatively, in the case of binders containing epoxide groups, the epoxide equivalent weight is preferably from 400 to 2500, more preferably from 420 to 2200, with particular preference from 430 to 2100, with very particular preference from 440 to 2000, and, in particular, from 440 to 1900.

The complementary functional groups described above can be incorporated into the binders in accordance with the customary and known methods of polymer chemistry. This can be done, for example, by incorporating monomers which carry the corresponding reactive functional groups, and/or with the aid of polymer-analogous reactions.

Examples of suitable olefinically unsaturated monomers containing reactive functional groups are (a1) monomers which carry at least one hydroxyl, amino, alkoxymethylamino, carbamate, allophanate or imino group per molecule, such as hydroxyalkyl esters of acrylic acid, methacrylic acid or another alpha,beta-olefinically unsaturated carboxylic acid, which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octa-hydro-4, 7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone and these hydroxyalkyl or hydroxycycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 carbon atoms per molecule, especially a Versatic® acid, or instead of the reaction product an equivalent amount of acrylic and/or methacrylic acid, which is then reacted during or after the polymerization reaction with the glycidyl ester of an alpha-branched monocarboxylic acid having 5 to 18 carbon atoms per molecule, especially a Versatic® acid;

aminoethyl acrylate, aminoethyl methacrylate, allylamine or N-methyliminoethyl acrylate;

N,N-di(methoxymethyl)aminoethyl acrylate or methacrylate or N,N-di(butoxymethyl)amino-propyl acrylate or methacrylate;

(meth)acrylamides such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;

acryloyloxy- or methacryloyloxyethyl, -propyl or butylcarbamate or allophanate; further examples of suitable monomers containing carbamate groups are described in the patents U.S. Pat. Nos. 3,479,328, 3,674,838, 4,126,747, 4,279,833 or 4,340,497;

acryloxysilane-containing vinyl monomers, preparable by reacting hydroxy-functional silanes with with epichlorohydrin and then reacting the reaction product with (meth)acrylic acid and/or hydroxyalkyl esters and/or hydroxycycloalkyl esters of (meth) acrylic acid and/or further hydroxyl-containing monomers (a1).

(a2) Monomers which carry at least one acid group per molecule, such as acrylic acid, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzenesulfonic acid (all isomers).

(a3) Monomers containing epoxide groups, such as the glycidyl ester of acrylic acid, methacrylic acid, ethacrylic acid, crotonic acid, maleic acid, fumaric acid or itaconic acid, or allyl glycidyl ether.

They are preferably used to prepare (meth)acrylate copolymers, especially the ones containing glycidyl groups.

More highly functional monomers of the type described above are generally used in minor amounts. For the purposes of the present invention, minor amounts of higher-functional monomers are those amounts which do not lead to crosslinking or gelling of the copolymers, in particular of the (meth) acrylate copolymers, unless the specific desire is to prepare crosslinked polymeric microparticles.

Examples of suitable monomer units for introducing reactive functional groups into polyesters or polyester-polyurethanes are 2,2-dimethylolethyl- or -propylamine blocked with a ketone, the resulting ketoxime group being hydrolyzed again following incorporation; or compounds containing two hydroxyl groups or two primary and/or secondary amino groups and also at least one acid group, in particular at least one carboxyl group and/or at least one sulfonic acid group, such as dihydroxypropionic acid, dihydroxysuccinic acid, dihydroxybenzoic acid, 2,2-dimethylolacetic acid, 2,2-dimethylolpropionic acid, 2,2-dimethylolbutyric acid, 2,2-dimethylolpentanoic acid, α, δ-diaminovaleric acid, 3,4-diaminobenzoic acid, 2,4-diaminotoluenesulfonic acid or 2,4-diaminodiphenyl ether sulfonic acid.

One example of introducing reactive functional groups by way of polymer-analogous reactions is the reaction of hydroxyl-containing resins with phosgene, resulting in resins containing chloroformate groups, and the polymer-analogous reaction of the with ammonia and/or primary and/or secondary amines to give resins containing carbamate groups. Further examples of suitable methods of this kind are known from the patents U.S. Pat. Nos. 4,758,632 A1, 4,301,257 A1 or U.S. Pat. No. 2,979,514 A1.

The binders of the dual-cure powder slurries of the invention or of the powder slurries of the invention that are curable purely with actinic radiation further comprise on average at least one, preferably at least two, group(s) having at least one bond per molecule that can be activated with actinic radiation.

For the purposes of the present invention, a bond that can be activated with actinic radiation is a bond which on exposure to actinic radiation becomes reactive and, with other activated bonds of its kind, enters into polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as double bonds.

Accordingly, the group which is preferred in accordance with the invention comprises one double bond or two, three or four double bonds. If more than one double bond is used, the double bonds can be conjugated. In accordance with the invention, however, it is of advantage if the double bonds are present in isolation, in particular each being present terminally, in the group in question. It is of particular advantage in accordance with the invention to use two double bonds or, in particular, one double bond.

The dual-cure binder or the binder that is curable purely with actinic radiation contains on average at least one of the above-described groups that can be activated with actinic radiation. This means that the functionality of the binder in this respect is integral, i.e., for example, is two, three, four, five or more, or nonintegral, i.e., for example, is from 2.1 to 10.5 or more. The functionality chosen depends on the requirements imposed on the respective dual-cure powder slurry of the invention or the powder slurry of the invention that is curable with actinic radiation.

If more than one group that can be activated with actinic radiation is used on average per molecule, the groups are structurally different from one another or of the same structure.

If they are structurally different from one another, this means, in the context of the present invention, that use is made of two, three, four or more, but especially two, groups that can be activated by actinic radiation, these groups deriving from two, three, four or more, but especially two, monomer classes.

Examples of suitable groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl, norbornenyl, isoprenyl, isopropenyl, allyl or butenyl ether groups; or dicyclopentadienyl, norbornenyl, isoprenyl, isopropenyl, allyl or butenyl ester groups, but especially acrylate groups.

Preferably, the groups are attached to the respective parent structures of the binders via urethane, urea, allophanate, ester, ether and/or amide groups, but in particular via ester groups. Normally, this occurs as a result of customary and known polymer-analogous reactions such as, for instance, the reaction of pendant glycidyl groups with the olefinically unsaturated monomers described above that contain an acid group, of pendant hydroxyl groups with the halides of these monomers, of hydroxyl groups with isocyanates containing double bonds such as vinyl isocyanate, methacryloyl isocyanate and/or 1-(1-isocyanato-1-methylethyl)-3-(1-methylethenyl)benzene (TMI® from CYTEC), or of isocyanate groups with the above-described hydroxyl-containing monomers.

Alternatively, in the dual-cure powder coating materials, it is possible to employ mixtures of purely thermally curable binders and binders that are curable purely with actinic radiation.

The material composition of the binders has basically no special features; rather, suitable binders include all the binders envisaged for use in powder clearcoat slurries curable thermally or thermally and with actinic radiation that are described in U.S. Pat. No. 4,268,542 A1 or U.S. Pat. No. 5,379,947 A1 and in patent applications DE 27 10 421 A1, DE 195 40 977 A1, DE 195 18 392 A1, DE 196 17 086 A1, DE 196 13 547 A1, DE 196 18 657 A1, DE 196 52 813 A1, DE 196 17 086 A1, DE 198 14 471 A1, DE 198 41 842 A1 or DE 198 41 408 A1, in German Patent Applications DE 199 08 018.6 or DE 199 08 013.5, unpublished at the priority date of the present specification, or in European Patent EP 0 652 264 A1;

all the binders envisaged for use in dual-cure clearcoats that are described in patent applications DE 198 35 296 A1, DE 197 36 083 A1 or DE 198 41 842 A1; or all the binders envisaged for use in thermally curable powder clearcoats and described in German Patent Application DE 42 22 194 A1, in the product information bulletin from BASF Lacke+Farben AG, "Pulverlacke", 1990, or in the BASF Coatings AG brochure "Pulverlacke, Pulverlacke für industrielle Anwendungen", January 2000.

In this context, (meth)acrylate addition copolymers are used predominantly for the powder slurries that are curable thermally or thermally and with actinic radiation.

Examples of suitable (meth)acrylate copolymers are the (meth)acrylate copolymers containing epoxide groups, having an epoxide equivalent weight of preferably from 400 to 2500, more preferably from 420 to 2200, with particular preference from 430 to 2100, with very particular preference from 440 to 2000, and, in particular, from 440 to 1900, a number-average molecular weight (determined by gel permeation chromatography using a polystyrene standard) of preferably from 2000 to 20,000 and in particular from 3000 to 10,000, and a glass transition temperature ($T_g$) of preferably from 30 to 80, more preferably from 40 to 70 and in particular from 40 to 60° C. (measured by means of differential scanning calorimetry (DSC), as suitable in particular for use in thermally curable powder clearcoat slurries (see above) and as described, furthermore, in the patents and patent applications EP 0 299 420 A1, DE 22 14 650 B1, DE 27 49 576 B1, U.S. Pat. No. 4,091,048 A1 or U.S. Pat. No. 3,781,379 A1).

Suitable additional binders for the dual-cure powder slurries of the invention, or suitable sole binders for the powder slurries of the invention that are curable purely with actinic radiation, are the binders envisaged for use in UV-curable clearcoats, powder clearcoats and powder slurry clearcoats and described in European Patent Applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, in German Patent Applications DE 198 35 206 A1, DE 197 09 467 A1, DE 42 03 278 A1, DE 33 16 593 A1, DE 38 36 370 A1, DE 24 36 186 A1 or DE 20 03 579 B1, in the International Patent Applications WO 97/46549 or WO 99/14254, or in U.S. Pat. Nos. 5,824,373 A1, 4,675,234 A1, 4,634,602 A1, 4,424,252 A1, 4,208,313 A1, 4,163,810 A1, 4,129,488 A1, 4,064,161 A1 or U.S. Pat. No. 3,974,303 A1.

The preparation of the binders also has no special features as to its method, but takes place with the aid of the customary and known methods of polymer chemistry, as described in detail, for example, in the patent documents recited above.

Examples of suitable preparation processes for (meth) acrylate copolymers are described in European Patent Application EP 0 767 185 A1, in German Patents DE 22 14 650 B1 or DE 27 49 576 B1, and in U.S. Pat. Nos. 4,091,048 A1, 3,781,379 A1, 5,480,493 A1, 5,475,073 A1 or U.S. Pat. No. 5,534,598 A1, or in the standard work Houben-Weyl, Methoden der organischen Chemie, $4^{th}$ Edition, Volume 14/1, pages 24 to 255, 1961. Suitable reactors for the copolymerization are the customary and known stirred vessels, cascades of stirred vessels, tube reactors, loop reactors or Taylor reactors, as described, for example, in the patents and patent applications DE 1 071 241 B1, EP 0 498 583 A1 or DE 198 28 742 A1 or in the article by K. Kataoka in Chemical Engineering Science, Volume 50, No. 9, 1995, pages 1409 to 1416.

The preparation of polyesters and alkyd resins is also described, for example, in the standard work Ullmanns Encyklopädie der technischen Chemie, $3^{rd}$ Edition, Volume 14, Urban & Schwarzenberg, Munich, Berlin, 1963, pages 80 to 89 and pages 99 to 105, and also in the following books: "Résines Alkydes-Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

The preparation of polyurethanes and/or acrylated polyurethanes is also described, for example, in the patent applications EP 0 708 788 A1, DE 44 01 544 A1 or DE 195 34 361 A1.

The binder content of the disperse phase, i.e., of the finely divided, dimensionally stable constituents, of the powder slurry clearcoats of the invention may vary very widely and depends in particular on whether they are physically curable, curable thermally with self-crosslinking and/or curable with actinic radiation. In both cases, it can be preferably from 20 to 99.99, more preferably from 25 to 99.9, with particular preference from 30 to 99.8, with very particular preference from 35 to 99.75, and, in particular, from 40 to 99.7% by weight, based in each case on the solids content of the powder slurry. In the other cases (curable thermally and/or with actinic radiation and externally crosslinking), the binder content is preferably from 10 to 80, more preferably from 15 to 75, with particular preference from 20 to 70, with very particular preference from 25 to 65, and, in particular, from 30 to 60% by weight, based in each case on the solids content of the powder slurry clearcoat of the invention.

The externally crosslinking powder slurry clearcoats of the invention curable thermally, or thermally and with actinic radiation, comprise at least one crosslinking agent which comprises the reactive functional groups complementary to the reactive functional groups of the binders. Consequently, the skilled worker is easily able to select the crosslinking agents suitable for a given powder slurry clearcoat.

Examples of suitable crosslinking agents are amino resins, as described for example in Römpp Lexikon Lacke und Druckfarben, George Thieme Verlag, 1998, page 29, "Amino resins", in the textbook "Lackadditive" by Johan Bieleman, Wiley-VCH, Weinheim, New York, 1998, pages 242 ff., in the book "Paints, Coatings and Solvents", second completely revised edition, Eds. D. Stoye and W. Freitag, Wiley-VCH, Weinheim, New York, 1998, pages 80 ff., in patents U.S. Pat. No. 4,710,542 A1 or EP 0 245 700 A1, and in the article by B. Singh and coworkers "Carbamylmethylated Melamines, Novel Crosslinkers for the Coatings Industry" in Advanced Organic Coatings Science and Technology Series, 1991, Volume 13, pages 193 to 207;

carboxyl-containing compounds or resins, as described for example in the patent DE 196 52 813 A1 or 198 41 408 A1, especially dodecanedioic acid;

epoxy-containing compounds or resins, as described for example in patents EP 0 299 420 A1, DE 22 14 650 B1, DE 27 49 576 B1, U.S. Pat. No. 4,091,048 A1 or U.S. Pat. No. 3,781,379 A1;

blocked polyisocyanates, as described for example in the patents U.S. Pat. No. 4,444,954 A1, DE 196 17 086 A1, DE 196 31 269 A1, EP 0 004 571 A1 or EP 0 582 051 A1;

beta-hydroxyalkylamides such as N,N,N',N'-tetrakis(2-hydroxyethyl)adipamide or N,N,N',N'-tetrakis(2-hydroxypropyl)adipamide; and/or tris(alkoxycarbonylamino)triazines, as described in patents U.S. Pat. Nos. 4,939,213 A1, 5,084,541 A1, 5,288,865 A1 or EP 0 604 922 A1.

The crosslinking agent content of the powder coating materials and powder slurry clearcoats of the invention may likewise vary very widely and depends on the requirements of the individual case, in particular on the number of reactive functional groups present. It is preferably from 1 to 40, more preferably from 2 to 35, with particular preference from 3 to 30, with very particular preference from 4 to 27, and, in particular, from 5 to 25% by weight, based in each case on the solids content of the powder slurry clearcoat of the invention.

In addition to the above-described constituents, the powder slurry clearcoats of the invention may further comprise at least one additive. Depending on its physicochemical properties and/or its function, said additive may be present essentially in the finely divided, dimensionally stable constituents of the powder slurry clearcoats of the invention or essentially in the continuous aqueous phase.

Examples of suitable additives are thermally curable reactive diluents such as positionally isomeric diethyloctanediols or hydroxyl-containing hyperbranched compounds or dendrimers as described in German Patent Applications DE 198 05 421 A1, DE 198 09 643 A1 or DE 198 40 405 A1;

reactive diluents curable with actinic radiation, such as those described in Römpp Lexikon Lacke und Druckfarben, George Thieme Verlag, Stuttgart, New York, 1998, on page 491 under the headword "Reactive diluents";

crosslinking catalysts such as dibutyltin dilaurate, lithium decanoate or zinc octoate, amine-blocked organic sulfonic acids, quaternary ammonium compounds, amines, imidazole and imidazole derivatives such as 2-styrylimidazole, 1-benzyl-2-methylimidazole, 2-methylimidazole and 2-butylimidazole, as described in Belgian Patent No. 756,693, or phosphonium catalysts such as ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide and tetrabutylphosphonium acetate-acetic acid complex, as are described, for example, in U.S. Pat. No. 3,477,990 A1 or U.S. Pat. No. 3,341,580 A1;

thermally labile free-radical initiators such as organic peroxides, organic azo compounds or C—C—cleaving initiators such as dialkyl peroxides, peroxocarboxylic acids, peroxodicarbonates, peroxide esters, hydroperoxides, ketone peroxides, azodinitriles or benzpinacol silyl ether;

photoinitiators, as described in Römpp Chemie Lexikon, 9$^{th}$ expanded and revised edition, Georg Thieme Verlag, Stuttgart, Vol. 4, 1991, or in Römpp Lexikon Lacke und Druckfarben, Georg Thieme Verlag, Stuttgart, 1998, pages 444 to 446;

antioxidants such as hydrazines and phosphorus compounds;

UV absorbers such as triazines and benzotriphenol;

light stabilizers such as HALS compounds, benzotriazoles or oxalanilides;

leveling agents;

free-radical scavengers and polymerization inhibitors such as organic phosphites or 2,6-di-tert-butylphenol derivatives;

slip additives;

defoamers;

emulsifiers, especially nonionic emulsifiers such as alkoxylated alkanols, phenols and alkylphenols, anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes, as described, for example, in detail in patent application DE 198 35 296 A1, especially in conjunction with the polyurethane-based associative thickeners described below;

adhesion promoters such as tricyclodecanedimethanol;

film-forming auxiliaries such as cellulose derivatives;

flame retardants;

devolatilizers such as diazadicycloundecane or benzoin;

water retention agents;

free-flow aids;

transparent fillers such as pyrogenic silica or nanoparticles based on silica, titanium dioxide or zirconium dioxide;

rheology control additives (thickeners), such as those known from patents WO 94/22968, EP-A-0 276 501, EP-A-0 249 201 or WO 97/12945; crosslinked polymeric microparticles, such as those disclosed, for example, in EP-A-0 008 127; inorganic sheet silicates such as aluminum-magnesium silicates, sodium-magnesium and sodium-magnesium-fluorine-lithium sheet silicates of the montmorillonite type; silicas such as Aerosils; or synthetic polymers having ionic and/or associative groups, such as polyvinyl alcohol, poly (meth)-acrylamide, poly(meth)acrylic acid, polyvinylpyrrolidone, styrene-maleic anhydride copolymers or ethylene-maleic anhydride copolymers and their derivatives or polyacrylates; or polyurethane-based associative thickeners, as described in Römpp Lexikon Lacke und Druckfarben, Georg Thieme Verlag, Stuttgart, New York, 1998, "Thickeners", pages 599 to 600, and in the textbook "Lackadditive" by Johan Bieleman, Wiley-VCH, Weinheim, New York, 1998, pages 51 to 59 and 65; especially combinations of ionic and nonionic thickeners, as described in patent application DE 198 41 842 A1 for establishing a pseudoplastic behavior, or the combination of polyurethane-based associative thickeners and polyurethane-based wetting agents, as is described in detail in German Patent Application DE 198 35 296 A1.

Further examples of suitable additives are described in the textbook "Lackadditive" by Johan Bieleman, Wiley-VCH, Weinheim, New York, 1998. They are employed in the customary and known amounts.

The preparation of the powder slurry clearcoats of the invention by the process of the invention is based on conventional processes for preparing powder slurry clearcoats.

In a first preferred variant, the powder slurry clearcoats of the invention are prepared from the constituents described above essentially as described in Patent Applications DE 195 40 977 A1, DE 195 18 392 A1, DE 196 17 086 A1, DE-A-196 13 547, DE 196 18 657 A1, DE 196 52 813 A1, DE 196 17 086 A1, DE-A-198 14 471 A1, DE 198 41 842 A1 or DE 198 41 408 A1 in detail.

In this case, a powder coating material known per se is converted into a powder slurry by means of wet milling in water or an aqueous medium, i.e., a mixture of water and at least one of the additives described above.

In another preferred variant of preparing the powder slurry clearcoats of the invention, the constituents described above are emulsified in an organic solvent to give an emulsion of the oil-in-water type, after which the organic solvent is removed; as a result of this, the emulsified droplets solidify and a powder slurry results. The powder slurry is then subjected to wet milling.

In a third preferred variant of preparing the powder slurry clearcoats of the invention, a liquid melt of the constituents described above is introduced into an emulsifying apparatus, preferably with the addition of water and stabilizers, and the emulsion obtained is cooled and filtered, giving a powder slurry. In order to achieve a high quality of mixing, it is essential to carry out mixing in the melt without solvent. Accordingly, the polymeric constituents are fed into the dispersing apparatus in the form of viscous resin melts. The powder slurry is then wet milled.

For the process of the invention and the powder slurry clearcoats of the invention it is essential that the above-described adducts for use in accordance with the invention and, if desired, the above-described solvents of high solvency are added to the powder slurries prior to wet milling. Wet milling of the adducts for use in accordance with the invention and, if desired, of the solvents with the other, above-described constituents results in the powder slurry clearcoats of the invention.

In terms of method, the wet milling operation has no special features but instead is carried out with the aid of customary and known apparatus such as stirred mills, for example.

Preferably, the resultant powder slurry clearcoats of the invention are filtered after wet milling. This is done using the customary and known filtration equipment and filters, as also suitable for filtering known powder slurries. The mesh size of the filters may vary widely and is guided primarily by the particle size and by the particle size distribution of the particles in the suspension. The skilled worker will therefore easily be able to determine the appropriate filters on the basis of this physical parameter. Examples of suitable filters are bag filters. These are available commercially under the brand names Pong® or Cuno®. It is preferred to use bag filters having mesh sizes from 10 to 50 $\mu$m, examples being Pong® 10 to Pong® 50.

The powder slurry clearcoats of the invention are used to produce clearcoat finishes, especially as part of multicoat color and/or effect finishes on primed and unprimed substrates.

The clearcoat finish of the invention or the multicoat color and/or effect finish comprising the clearcoat finish of the invention is used in particular in automotive finishing, in the coating of interior and exterior constructions, in the coating of furniture, doors and windows, and in industrial coating, including coil coating and container coating, appropriate substrates being all those which are known and customary in these technical fields, made of metal, plastic, glass, wood, textile, leather, natural stone, synthetic stone, concrete, cement or composites of these materials, preference being given to the electrically conductive substrates.

The multicoat color and/or effect finish of the invention is preferably preparable on a substrate by (1) applying a surfacer or functional coating material to a cathodically deposited and thermally cured electrodeposition coating, or wet-on-wet to a cathodically deposited, uncured or only part-cured electrodeposition coating film, and then (2) subjecting the resultant surfacer film or functional film, on its own, to curing thermally, or thermally and with actinic radiation, or, together with the electrodeposition coating film, to curing thermally, or thermally and with actinic radiation, to give the surfacer coat, antistonechip primer, or functional coat, (3) applying a basecoat, especially an aqueous basecoat, to the surfacer coat, antistonechip primer or functional coat, to give a basecoat film, (4) flashing off or drying the basecoat film without completely crosslinking it, or—alternatively—curing it physically, thermally and/or with actinic radiation, to give the basecoat, (5) applying at least one powder slurry clearcoat of the invention to the basecoat film or—alternatively—to the basecoat, and then (6) curing the basecoat film and the resulting powder slurry clearcoat film(s) together, thermally and/or with actinic radiation, or—alternatively—curing the powder slurry clearcoat film(s), on its (their) own, thermally and/or with actinic radiation, to give the basecoat and the clearcoat(s).

In a further preferred variant, the multicoat color and/or effect finish of the invention is preparable on a substrate by (1) applying a surfacer or functional coating material to a cathodically deposited and thermally cured electrodeposition coating, and then (2) flashing off or drying the resulting surfacer film or functional film, without completely crosslinking it, (3) applying a basecoat material, especially an aqueous basecoat material, to the surfacer film or functional film, to give a basecoat film, (4) flashing off or drying the basecoat film, without completely crosslinking it, (5) applying at least one powder slurry clearcoat of the invention to the basecoat film, and then (6) curing the surfacer film or functional film, the basecoat film and the powder slurry clearcoat film(s) together, thermally and/or with actinic radiation, to give the surfacer coat, antistonechip primer or functional coat, the basecoat, and the clearcoat(s).

Examples of suitable cathodic electrodeposition coating materials and also, where appropriate, of wet-on-wet processes are described in Japanese Patent Application 1975-142501 (Japanese Laid-Open Specification JP 52-065534 A2, Chemical Abstracts No. 87: 137427) or in the patents U.S. Pat. Nos. 4,375,498 A1, 4,537,926 A1, 4,761,212 A1, EP 0 529 335 A1, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 or WO 98/07794.

Examples of suitable surfacers, especially aqueous surfacers, which are also referred to as antistonechip primers or functional coatings, are described in patents U.S. Pat. No. 4,537,926 A1, EP 0 529 335 A1, EP 0 595 186 A1, EP 0 639 660 A1, DE 44 38 504 A1, DE 43 37 961 A1, WO 89/10387, U.S. Pat. Nos. 4,450,200 A1, 4,614,683 A1 or WO 94/26827.

Examples of suitable basecoat materials, preferably aqueous basecoat materials, especially polyurethane-based aqueous basecoat materials, are known from patents EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 or EP 0 817 684, column 5, lines 31 to 45.

These aqueous basecoat materials may also be used as functional coating materials for producing functional films and functional coats.

The resultant clearcoats or multicoat color and/or effect finishes of the invention may further be coated with a scratchproof coating of an organically modified ceramic material, as available commercially under the brand name ORMOCER®, for example.

In general, the coating materials are applied in a wet film thickness such that curing thereof results in coatings having the coat thicknesses which are necessary and advantageous for their functions. In the case of the electrodeposition coating, these thicknesses are from 5 to 40, preferably from 10 to 35, with particular preference from 12 to 30 and in particular from 15 to 25 $\mu$m; in the case of the surfacer coat, antistonechip primer or functional coats they are from 10 to 60, preferably from 11 to 55, with particular preference from 12 to 50 and in particular from 13 to 45 $\mu$m; in the case of the basecoat they are from 5 to 50, preferably from 5 to 40, with particular preference from 5 to 30 and in particular from 10 to 25 $\mu$m; and in the case of the clearcoat of the invention they are from 10 to 100, preferably from 15 to 80, with particular preference from 20 to 75 and in particular from 25 to 70 $\mu$m. However, in the multicoat finish of the invention the functional coat may have only a coat thickness of from 20 to 50% of the overall coat thickness of functional coat and basecoat.

Although the powder slurry clearcoats of the invention are also suitable for use outside of automobile finishing, their principal industrial end use lies within said sector since it is here that their special advantages are manifested quite obviously. The substrates are therefore motor vehicle bodies, especially automobile bodies, and also parts thereof, such as doors, engine hoods, wings, trunk lid spoilers, sills or wind deflectors, for example.

These substrates consist in particular of steel or aluminum. The metal surfaces may in this case carry primers. In the case of aluminum, for example, there may be an oxide layer produced by anodic oxidation (Eloxal® process). In the case of steel, there is normally a thermally cured cathodic electrodeposition coating. However, it is also possible to use a cathodic electrodeposition coating film which has not been thermally cured but is merely dried or partially cured.

The powder slurry clearcoats of the invention can be applied using the methods known from liquid coating technology. In particular, they can be applied by means of spraying processes. Preferably, they are applied by electrostatic painting of the exterior body parts followed by pneumatic spraying (compressed-air spraying) of the interior body parts.

The electrostatic painting can take place by means of an electrostatic spraying gap, an electrostatic spraying bell, or an electrostatic spraying disk.

Furthermore, the electrostatic painting may take place by means of electrostatically assisted mechanical atomization. Preferably, this is carried out with the aid of electrostatic high-speed rotary disks or high-speed rotary bells.

The pneumatic spraying or compressed-air painting, as well, has no special features as to its method, but can be carried out by hand or using customary and known automatic painting equipment or paint robots.

For further details, reference is made here to Römpp Lexikon Lacke und Druckfarben, Georg Thieme Verlag, Stuttgart, New York, 1998, page 186: "Electrostatic painting", page 187: "Electrostatic spray guns", "Electrostatic Spraying", and page 165: "Compressed-air spraying".

Preferably, application is carried out under illumination with visible light having a wavelength of more than 550 $\mu$m or in the absence of light if the powder slurry clearcoats of the invention are curable (inter alia) with actinic radiation. By this means, material alteration or damage to the coating material to be used in accordance with the invention and to the overspray is avoided.

Of course, these application processes can also be employed for the application of additional coating films, provided the coating materials concerned are not electrodeposition coating materials.

The method of curing the applied electrodeposition coating films, surfacer films or functional films, basecoat films and clearcoat films of the invention has no special features but instead takes place with the aid of the customary and known processes and apparatus.

For physical curing, it is not necessary per se to take any special measures, although physical curing may be assisted by atmospheric oxygen, by heat, or by exposure to actinic radiation.

Thermal curing may be carried out after a certain resting time or flash-off time. It may last for from 30 seconds to 2 hours, preferably from 1 minute to 1 hour, and in particular from 1 minute to 45 minutes. The resting time is used, for example, for leveling and degassing of the films and for the evaporation of volatile constituents such as any solvents and/or water that may still be present. Flashing-off can be accelerated by an elevated temperature, though still below that for curing, and/or by reduced atmospheric humidity.

The thermal curing, for example, takes place by heating in a convection oven or irradiation with IR and/or NIR lamps. As in the case of curing with actinic radiation, the thermal curing may also take place in stages. Advantageously, thermal curing takes place at temperatures from 100 to 180° C.

In the case of curing with actinic radiation, it is preferred to employ a dose of from 1000 to 3000, preferably from 1100 to 2900, with particular preference from 1200 to 2800, with very particular preference from 1300 to 2700, and in particular from 1400 to 2600, mJ/cm$^2$. If desired, this curing may be supplemented by actinic radiation from other radiation sources. In the case of electron beams, it is preferred to operate under an inert gas atmosphere. This can be ensured, for example, by supplying carbon dioxide and/or nitrogen directly to the surface of the powder slurry coat. In the case of curing with UV radiation as well, it is possible to operate under inert gas in order to prevent the formation of ozone.

Curing with actinic radiation is carried out using the customary and known radiation sources and optical auxiliary measures. Examples of suitable radiation sources are flashlights from the company VISIT, high-pressure or low-pressure mercury vapor lamps, with or without lead doping in order to open a radiation window of up to 405 nm, or electron beam sources. The arrangement of these sources is known in principle and may be adapted to the circumstances of the workpiece and the process parameters. In the case of workpieces of complex shape, as provided for automobile bodies, those regions not accessible to direct radiation (shadow regions), such as cavities, folds and other structural undercuts, may be (partially) cured using point, small-area or all-round emitters, in combination with an automatic movement apparatus for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom, 1984.

Full curing here may take place in stages, i.e., by multiple exposure to light or actinic radiation. It can also take place in alternation; in other words, by curing alternately with UV radiation and electron beams.

In the case of dual cure, thermal curing and curing with actinic radiation can be employed simultaneously or in succession. If the two curing methods are used in succession, it is possible, for example, to commence with thermal curing and end with curing with actinic radiation. In other cases, it may prove advantageous to commence and to end with curing with actinic radiation.

The powder slurry coat of the invention is preferably cured in the molten state using the above-described methods.

Overall, the processes of the invention for producing the multicoat effect finishes of the invention offer the extremely environmentally and economically advantageous and significant possibility of realizing coating systems on a purely aqueous basis without emission of volatile organic substances.

The clearcoats and multicoat color and/or effect finishes obtained in the manner of the invention are distinguished by very good substrate adhesion, very good intercoat adhesion, outstanding corrosion protection, very good protection against stone chipping and other mechanical damage, and a very good overall visual appearance, especially as regards depth of color, metallic effect, dichroic effect, and D.O.I. (distinctness of the reflected image), and high scratch, chemical and weathering resistance. In particular, however, the clearcoat finishes of the invention no longer exhibit surface defects such as depressions, craters or agglomerates.

The bodies of the invention coated accordingly therefore impart a particularly high overall esthetic impression and have a particularly long service life.

EXAMPLE

The Preparation of a Multicoat Effect Finish of the Invention Using a Powder Slurry of the Invention For the example, a powder coating material was first prepared, as described in German Patent Application DE 196 13 547 A1, from 77.4 parts by weight of a methacrylate copolymer formed from methyl methacrylate, glycidyl methacrylate, n-butyl acrylate and styrene, 19.4 parts by weight of dodecanedioic acid, 2 parts by weight of a commercial UV absorber (Ciba® CGL 1545), 1 part by weight of the commercial light stabilizer Tinuvin® 123, and 0.25 part by weight of the commercial antiozidant Irgafos® PEPQ.

This powder coating material was dispersed in water in accordance with the experimental procedure specified in German Patent Application DE 196 13 547 A1, column 6, to give a powder slurry.

Prior to the wet milling of the powder slurry in a customary and known stirred mill, it was admixed with the make-up composition stated in the table. Wet milling then gave the powder slurry clearcoat of the invention with an average particle size of from 3 to 5 μm.

Prior to application, the powder slurry clearcoat of the invention was further filtered through a bag filter with a mesh size of 50 μm.

The table gives an overview of the nature and amount of the constituents used.

TABLE

The preparation of the powder slurry

| Constituent | Parts by weight |
|---|---|
| Predispersion: | |
| DI water[a] | 42 |
| Disperse Aid W22[b] | 1.03 |
| Triton X100[c] | 0.02 |
| Dimethylethanolamine | 0.08 |
| RM 8[d] | 0.9 |
| Powder coating material | 28 |
| Make-up Composition: | |
| DI water[a] | 17.49 |
| RM 8[d] | 0.7 |
| Byk 333[e] | 0.05 |
| Triton X100[c] | 0.18 |
| Pluriol® 600[f] | 0.155 |
| Solvenon® IPP[g] | 0.31 |

[a] deionized water;
[b] poluurethane-based dispersant from Daniel Products;
[c] defoamer from Union Carbide;
[d] polyurethane-based thickener from Rohm & Haas;
[e] leveling agent from Byk Chemie;
[f] polypropylene glycol Pluriol® 600 from BASF Aktiengesellschaft;
[g] solvent of high solvency from BASF Aktiengesellschaft.

To produce the multicoat finish of the invention, test panels measuring 10 cm×20 cm were produced in a customary and known manner. For this purpose, steel panels (body panels) coated with a customary and known cathodically deposited and baked electrodeposition coating (EDC) were coated with a commercially customary thin-film surfacer (Ecoprime® from BASF Coatings AG), after which the resulting surfacer film was flashed off at 20° C. for five minutes at a relative atmospheric humidity of 65% and then dried at 80° for five minutes in a convection oven. After that, the surfacer coats had a dry film thickness of 15 μm.

After the test panels had cooled to 20° C., a commercially customary aqueous basecoat (Ecostar® from BASF Coatings AG) was applied and the coated panels were flashed off at 20° C. for five minutes at a relative atmospheric humidity of 65% and then dried at 80° C. for five minutes in a convection oven, so that the dried basecoat films had a dry film thickness of approximately 15 μm.

After the test panels had again been cooled to 20° C., the basecoats were overcoated with the powder slurry of the invention. The resultant powder slurry clearcoat films were flashed off at 20° C. for three minutes at a relative atmospheric humidity of 65% and dried at 60° C. for five minutes in a convection oven.

Following the application of all three coats, they were baked together at 155° C. for 30 minutes to give the multicoat finish of the invention. Its clearcoat of the invention had a film thickness of 40 μm. It was highly glossy and possessed outstanding solvent resistance (more than 100 double strokes in the methyl ethyl ketone test without damage) and good humidity resistance. The intercoat adhesion was very good. The clearcoat finish of the invention was resistant to scratching, chemicals, and weathering. It had no surface defects such as popping marks, craters, depressions, or agglomerates.

What is claimed is:

1. A powder clearcoat, wherein the powder clearcoat is one of a dispersion and a slurry, prepared by a method comprising
  a. dispersing a powder clearcoat in an aqueous medium,
  b. adding an adduct that is at least one of
    i) an adduct of ethylene oxide with at least one glycol, and/or
    ii) an adduct of propylene oxide with at least one glycol,
    wherein the at least one glycol is at least one of 1,2-propylene glycol 1,2-butylene glycol, 1,3-butylene glycol, to form a composition, and
  c. wet milling the composition.

2. The powder clearcoat of claim 1, wherein the glycol is 1,2- propylene glycol.

3. The powder clearcoat of claim 2, wherein the adduct is an adduct of propylene oxide with 1,2-propylene glycol.

4. The powder clearcoat of claim 3, wherein the number-average molecular weight of the polypropylene glycol is from 350 to 1000 daltons.

5. The powder clearcoat of claim 1, wherein the adduct is added in an amount of from 0.01 to 2.0% by weight, based on the solids content of the powder clearcoat.

6. The powder clearcoat of claim 1, wherein together with the adduct from 0.01 to 1.9 parts by weight of at least one organic solvent is added per 100 parts by weight of solids of the powder clearcoat.

7. The powder clearcoat of claim 1, wherein the powder clearcoat is curable by one of i) physically, ii) thermally, and iii) thermally and with actinic radiation.

8. The powder clearcoat of claim 1, wherein the powder clearcoat is pseudoplastic.

9. A method comprising applying the powder clearcoat of claim 1 to a substrate to produce a clearcoat finish.

10. A multicoat color and/or effect finish prepared by a method comprising
  I) one of
    A. a method comprising
      1. applying one of a surfacer and a functional coating material to a cathodically deposited and thermally cured electrodeposition coating to form a film, and
      2. subjecting the film to curing by one of i) thermally and ii) thermally and with actinic radiation to form a coating, and
    B. a method comprising
      1. applying one of a surfacer and a functional coating material wet-on-wet to a cathodically deposited, uncured or only partly-cured electrodeposition coating film to form a film, and
      2. curing the electrodeposition coating film and film together by one of i) thermally and ii) thermally with actinic radiation to form a coating,
  II) applying a basecoat material to the coating to give a basecoat film, III) one of
- A. a method comprising
  1. at least one of i) flashing off and ii) drying the basecoat film without completely crosslinking the basecoat film,
  2. applying at least one powder clearcoat of claim 1 to the basecoat film to form at least one powder clearcoat film, and
  3. curing the basecoat film and the at least one powder clearcoat film together by one of i) thermally and ii) thermally and with actinic radiation, and
- B. a method comprising
  1. curing the basecoat film by one of i) physically, ii) thermally, and iii) thermally and with actinic radiation to form a basecoat,
  2. applying at least one powder clearcoat of claim 1 to the basecoat to form at least one powder clearcoat film, and
  3. curing the at least one powder clearcoat film by one of i) thermally and ii) thermally and with actinic radiation.

11. A multicoat color and/or effect finish prepared by a method comprising

I. applying one of i) a surfacer and ii) a functional coating material to a cathodically deposited and thermally cured electrodeposition coating to form a film, II. at least one of i) flashing off and ii) drying the film without completely crosslinking the film, III. applying a basecoat material to the film to give a basecoat film, IV. at least one of i) flashing off and ii) drying the basecoat film without completely crosslinking the basecoat film, V. applying at least one powder clearcoat of claim 1 to the basecoat film to form at least one powder clearcoat film, VI. curing the film, the basecoat film, and the at least one powder clearcoat film together by one of i) thermally and ii) thermally and with actinic radiation.

* * * * *